United States Patent
Sekiya et al.

(10) Patent No.: US 7,162,622 B2
(45) Date of Patent: Jan. 9, 2007

(54) MICROCOMPUTER FOR APPARATUS CONTROL AND VEHICLE-MOUNTED ELECTRONIC CONTROL UNIT INCORPORATING MICROCOMPUTER

(75) Inventors: Katsurou Sekiya, Nukata-gun (JP); Hideaki Ishihara, Okazaki (JP); Kyouichi Suzuki, Toyohashi (JP); Masahiro Kamiya, Nishio (JP)

(73) Assignee: Denso Corporation, Kariya (JP)

( * ) Notice: Subject to any disclaimer, the term of this patent is extended or adjusted under 35 U.S.C. 154(b) by 477 days.

(21) Appl. No.: 10/367,731

(22) Filed: Feb. 17, 2003

(65) Prior Publication Data

US 2003/0159027 A1 Aug. 21, 2003

(30) Foreign Application Priority Data

Feb. 15, 2002 (JP) ............................. 2002-038257
Dec. 18, 2002 (JP) ............................. 2002-366988

(51) Int. Cl.
*G06F 9/24* (2006.01)
*G06F 15/177* (2006.01)

(52) U.S. Cl. ............................................. 713/1; 713/2
(58) Field of Classification Search .................. 713/1
See application file for complete search history.

(56) References Cited

U.S. PATENT DOCUMENTS

| | | | | |
|---|---|---|---|---|
| 4,200,912 A | * | 4/1980 | Harrington et al. | ......... 710/269 |
| 4,627,060 A | * | 12/1986 | Huang et al. | .................. 714/36 |
| 5,461,649 A | * | 10/1995 | Bailey et al. | .................. 327/28 |
| 5,859,987 A | * | 1/1999 | Gillespie et al. | ............ 710/311 |
| 5,961,641 A | | 10/1999 | Hasegawa et al. | |
| 6,154,837 A | * | 11/2000 | Fudeyasu et al. | ............... 713/2 |
| 6,249,848 B1 | | 6/2001 | Terada et al. | |
| 6,275,911 B1 | | 8/2001 | Terada et al. | |
| 6,341,239 B1 | * | 1/2002 | Hayashi et al. | ................ 700/79 |
| 6,405,328 B1 | * | 6/2002 | Vasanoja | ...................... 714/55 |
| 6,477,626 B1 | | 11/2002 | Terada et al. | |
| 6,505,280 B1 | | 1/2003 | Terada et al. | |
| 6,697,973 B1 | * | 2/2004 | Baumeister et al. | .......... 714/55 |
| 6,957,296 B1 | | 10/2005 | Terada et al. | |
| 2003/0041217 A1 | | 2/2003 | Terada et al. | |

(Continued)

FOREIGN PATENT DOCUMENTS

JP 63-206852 8/1988

(Continued)

OTHER PUBLICATIONS

Notification of Reasons For Rejection dated Mar. 22, 2006 in Japanese Application No. 2002-366988 with English translation.

*Primary Examiner*—James K. Trujillo
*Assistant Examiner*—Stefan Stoynov
(74) *Attorney, Agent, or Firm*—Harness, Dickey & Pierce, PLC

(57) ABSTRACT

A microcomputer which is to be utilized in a condition of being built into an apparatus such as a vehicle ECU, includes a ROM having stored therein a program which is prepared by a user and a boot ROM which stores an initialization program for performing at least essential initialization processing which is required for all application programs that will be executed by the microcomputer. The need for the user to generate program contents relating to such initialization processing is thereby eliminated, while increased reliability of operation of the microcomputer is achieved. In addition, it is possible for user-specified initialization data to be read out from a user program and utilized in a part of the initialization processing of the initialization program.

33 Claims, 17 Drawing Sheets

U.S. PATENT DOCUMENTS

2006/0053235 A1 3/2006 Terada et al.

FOREIGN PATENT DOCUMENTS

| JP | 04-361311 | 12/1992 |
|---|---|---|
| JP | 9-81396 | 3/1997 |
| JP | 09-319726 | 12/1997 |
| JP | 9-319727 | 12/1997 |
| JP | 10-011269 | 1/1998 |
| JP | 11-219299 | 8/1999 |
| JP | 2000-59981 | 2/2000 |
| JP | 2001-347045 | 12/2001 |

* cited by examiner

FIG. 4

| TIME OF EXECUTION | EXECUTION TYPE | PROCESSING CONTENTS |
|---|---|---|
| IMMEDIATELY AFTER RELEASE FROM RESET | ALWAYS EXECUTED | INHIBIT INTERRUPTS |
| | | CLEAR ZERO REGISTER |
| | | CLEAR SYS FLAGS |
| | | CLEAR RESOURCE ADDRESS ACCESS REGISTER |
| | EXECUTED IF SELECTED BY USER | SET DURATION OF OSCILLATION STABILIZATION INTERVAL |
| | | SET LOWER LIMIT COUNT VALUE OF WATCHDOG TIMER |
| | | SET UPPER LIMIT COUNT VALUE OF WATCHDOG TIMER |
| | | SET THE CLOCK SOURCE OF WATCHDOG TIMER |
| IMMEDIATELY AFTER WAKE-UP | ALWAYS EXECUTED | INHIBIT INTERRUPTS |
| | EXECUTED IF SELECTED BY USER | SET DURATION OF OSCILLATION STABILIZATION INTERVAL |
| | | SET LOWER LIMIT COUNT VALUE OF WATCHDOG TIMER |
| | | SET UPPER LIMIT COUNT VALUE OF WATCHDOG TIMER |
| | | SET THE CLOCK SOURCE OF WATCHDOG TIMER |

FIG. 5A

| 1 | 1 | 1 | i | N | Z | V | C |
|---|---|---|---|---|---|---|---|

STATUS REGISTER 31

FIG. 5B

| SYMBOL AND BIT POSITION | NAME | VALUE | SIGNIFICANCE |
|---|---|---|---|
| C (bit 0) | CARRY FLAG | 0 | CARRY HAS NOT OCCURRED |
| | | 1 | CARRY OCCURRED (CARRY IS SET AT TIME OF 0xffffff – 0x000000) |
| V (bit 1) | OVERFLOW FLAG | 0 | OVERFLOW HAS NOT OCCURRED |
| | | 1 | OVERFLOW HAS OCCURRED (OVERFLOW IS SET AT TIME OF 0x7fffff – 0x800000) |
| Z (bit 2) | ZERO FLAG | 0 | CALCULATION RESULT ≠ 0 |
| | | 1 | CALCULATION RESULT = 0 |
| N (bit 3) | SIGN FLAG | 0 | CALCULATION RESULT IS POSITIVE NUMBER (BIT 31 = 0) |
| | | 1 | CALCULATION RESULT IS NEGATIVE NUMBER (BIT 31 = 1) |
| i (bit 4) | INTERRUPT MASK FLAG | 0 | INTERRUPT ENABLED STATUS |
| | | 1 | INTERRUPT INHIBITED STATUS |

FIG. 7A

STATUS REGISTER 32

| EOP | EAD | MON | 0 |
|-----|-----|-----|---|

FIG. 7B

| SYMBOL AND BIT POSITION | NAME | VALUE | SIGNIFICANCE |
|---|---|---|---|
| MON (bit 1) | MONITORING FLAG | 0 | NO OCCURRENCE OF RESET OR NMI |
|  |  | 1 | • RESET HAS JUST OCCURRED<br>• NON-MASKABLE INTERRUPT PROCESSING IN PROGRESS |
| EAD (bit 2) | ADDRESS BOUNDARY ERROR FLAG | 0 | ADDRESS BOUNDARY ERROR HAS NOT OCCURRED |
|  |  | 1 | ADDRESS BOUNDARY ERROR HAS OCCURRED |
| EOP (bit 3) | UNDEFINED OPERATING CODE ERROR FLAG | 0 | UNDEFINED OPERATING CODE ERROR HAS NOT OCCURRED |
|  |  | 1 | UNDEFINED OPERATING CODE ERROR HAS OCCURRED |

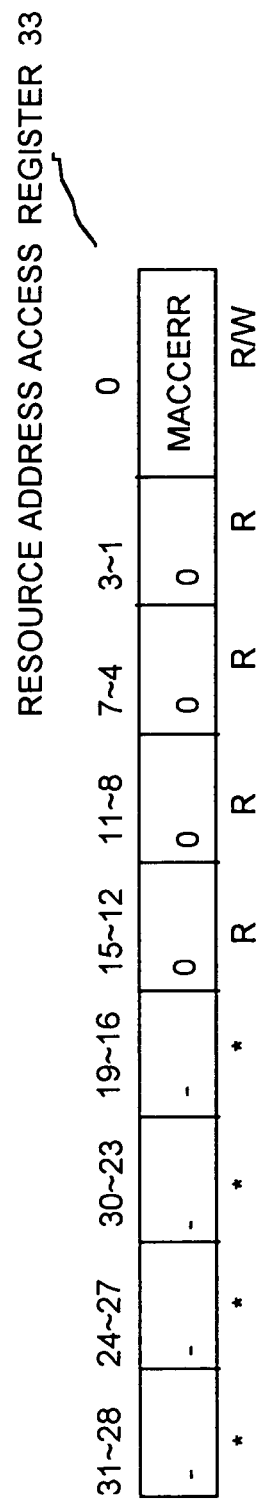

MICROCOMPUTER FOR APPARATUS CONTROL AND VEHICLE-MOUNTED ELECTRONIC CONTROL UNIT INCORPORATING MICROCOMPUTER

BACKGROUND OF THE INVENTION

1. Field of Application

The present invention relates to a microcomputer which operates in a condition of being built into an apparatus that is at least partially controlled by the microcomputer, with the microcomputer including a CPU (Central Processing Unit) and a ROM (Read-Only Memory) having stored therein a user program which is executed by the CPU.

The invention further relates to a vehicle ECU (Electronic Control Unit) which incorporates such a microcomputer.

2. Description of Prior Art

FIG. 17 is a general block diagram showing the basic elements of a prior art type of microcomputer which is used in a condition of being built into an apparatus that is controlled by the microcomputer. The microcomputer 1 is based on a CPU 2, and includes a ROM 3 having stored therein a program that has been generated by a user and which is executed by the CPU 2, and peripheral circuits which perform various operations and are accessed through execution of the aforementioned program by the CPU 2. The peripheral circuits can for example include a RAM (Random Access Memory) 4 which is used as a work area by the CPU 2, a DMA (Direct Memory Access) controller 5 for performing DMA transfers of data, an interrupt controller 6 for controlling the supply of interrupts to the CPU 2, a watchdog timer 7 which monitors the operating condition of the CPU 2, and an A/D (analog-to-digital) converter 8 for converting analog signals to digital signals.

It should be understood that the term "user" of a microcomputer is used herein to signify an individual or company responsible for preparing an application program that will be executed by the microcomputer.

A user generates an application program beforehand, and stores this in the ROM 3 of the microcomputer 1. Thereafter, each time operation of the microcomputer is started, the CPU 2 reads out the contents of the program stored in the ROM 3, and performs processing accordingly to control a controlled apparatus.

With such a control microcomputer, the CPU 2 must execute various initialization operations before actually beginning to control the controlled apparatus by means of an application program that has been generated by the user. In the prior art, such initialization processing is performed through initialization routines and/or a program module, generated by the user and located at the head of the overall program, i.e., immediately prior to the start of the application program. However the initialization processing includes portions which, for the same type of microcomputer, are always the same, irrespective of the contents of the user application. In addition such parts of the initialization processing include portions which, if not correctly generated and stored in the ROM 3, may result in unreliable operation of the microcomputer 1. For that reason, preparation of such a program module or initialization processing routines, as part of a program that is prepared by a user, constitutes a substantial burden on the user.

SUMMARY OF THE INVENTION

It is an objective of the present invention to overcome the problems described above, by providing a microcomputer whereby the burden of program generation by a user can be substantially reduced. It is a further objective to provide a vehicle ECU (Electronic Control Unit) which incorporates such a microcomputer.

To achieve the above objectives, according to a first aspect, the invention provides a microcomputer having a boot ROM which is accessed by the CPU of the microcomputer when the CPU is released from the reset condition, before the CPU begins to execute a user program that is held stored in a user ROM. An initialization program is stored beforehand in the boot ROM, and execution of that initialization program has the effect of performing initialization processing which is essential for enabling execution of the user program.

That is to say, the boot ROM has stored therein a program for executing essential initialization processing. After the CPU has accessed the boot ROM and performed the initialization processing, the CPU begins to execute the user program. Hence, it becomes unnecessary for a user to insert into the user program a portion (i.e., initialization routine) to perform essential initialization processing that is required for all types of applications. Thus, the work of preparing the user program is simplified.

Furthermore, since provision of such essential initialization processing is not left up to the user, the reliability of operation of the microcomputer is enhanced. Moreover since it is no longer necessary for the user to perform debugging of a program portion relating to such essential initialization processing, the overall time required for program development can be shortened.

According to another aspect, the invention makes it possible for a user to write data into a user program which will be read out and used as set values, by the CPU of the microcomputer, when executing the initialization program that is stored in the boot ROM. The user can thereby readily specify data which will be set as initial values, in that initialization processing.

More specifically, a region of a memory into which a user program is written (e.g., a user ROM) is reserved as a user setting region, into which data can be written that will be used as set values during execution of the initialization program stored in the boot ROM. During execution of the initialization program, the contents of that user setting region are read out to obtain the respective user-selected set values, which are then used in subsequent initialization processing by the initialization program. In that way, the user can determine specific initial values that are to be applied in the initialization processing.

In addition, the user is enabled to modify the contents of the initialization processing, by selectively omitting to write one or more user-selected set values into the user setting region. In that case, the initialization program stored in the boot ROM is configured such that, when it is found that a user-selected set value for some specific function has been omitted from being written into the user setting region, a predetermined corresponding default value is set, for that function, in the subsequent initialization processing.

Furthermore in the case of a microcomputer in which a vibrator element (i.e., such as a quartz crystal vibrator) is connected to a clock signal generating circuit which generates an operating clock signal of the CPU, the functioning of the vibrator element is unstable during a certain time interval following start-up of the clock signal generating circuit operation after the microcomputer is released from the reset condition. With the present invention, the initialization processing is executed during that period of unstable operation of the vibrator element. In the prior art, following release from the reset condition, the initialization processing is not executed until the period of unstable operation of the vibrator element has ended, and the vibrator element operation has stabilized. As a result, there is no guarantee of satisfactory functioning of the microcomputer during that period of instability. However with the present invention, by executing the initialization processing during that period of instability, the possibility of defective operation can be reduced substantially, and the reliability of the microcomputer enhanced.

With the present invention, according to another aspect, the initialization processing is executed immediately following release from the reset condition of the CPU. Due to manufacturing deviations in components such as vibrator elements, the duration of the period of unstable operation of a vibrator element is not fixedly determined. However with the present invention, by executing the initialization processing immediately following release from the reset condition, variations in the duration of the period of instability, between different vibrator elements, will have no effect upon performance of the microcomputer.

According to another aspect, the CPU also accesses the boot ROM when operation in a low power consumption mode is terminated, and executes a part of the initialization processing which is necessary for restarting operation. In that way, the CPU can enter a low power consumption mode in which it is inactive, and when that mode is exited from, can then establish the same set of initial conditions as when the CPU operation is started after being released from the reset condition.

According to another aspect, when operation of the CPU in the low power consumption mode is terminated, so that operation of the aforementioned clock signal generating circuit is restarted, initialization processing is executed during the aforementioned period of unstable operation of the vibrator element. Hence, similar effects are obtained to those described above for the case of executing the initialization processing during that period of unstable operation of the vibrator element following release of the CPU from the reset condition.

In addition, execution of the initialization program can begin immediately following termination of operation in the low power consumption mode. This provides the same advantages as described above for the case of release of the CPU from the reset condition.

According to another aspect, the microcomputer is repetitively set in the low power consumption mode (i.e., while it is set to operate in the normal power consumption mode), with a fixed repetition period. As a result, the initialization processing is repetitively executed, and hence, increased reliability is attained when the microcomputer is used in an environment where there is a high probability of induced electrical noise.

According to another aspect, processing to inhibit the transfer of interrupts to the CPU is performed as part of the initialization processing. That is to say, if an interrupt should be generated immediately after the CPU has been released from the reset state, it is impossible for the CPU to immediately respond to that interrupt. It is hence necessary that an "interrupt inhibited" condition be established while the initialization processing is being executed. With the present invention, this interrupt inhibit processing is performed as part of the initialization processing, when executing the initialization program, with no intervention by the user being necessary. Hence, the burden of program preparation for the user is further reduced.

According to another aspect, the initialization processing includes initialization of internal registers of the CPU. This setting of initial values in the internal registers is always necessary, before execution of the user program by the CPU can begin. With the present invention, setting of appropriate initial values in the internal registers is performed as part of the initialization processing, with no intervention by the user being necessary. Hence, the burden of program preparation for the user is further reduced.

According to another aspect, the initialization processing can include setting of the duration of one or more limit periods of a watchdog timer. When a watchdog timer is used to monitor the operating status of the CPU, it is necessary that the period of the watchdog timer is preset to an appropriate value. With the present invention, such setting can be performed as part of the initialization processing that is executed by the initialization program stored in the boot ROM, with no intervention by the user being necessary. Hence, the burden of program preparation for the user is further reduced.

In addition, when a watchdog timer is utilized, the frequency of a clock signal source which serves as the timebase for the watchdog timer can be set, in the initialization processing that is executed by the initialization program stored in the boot ROM.

According to another aspect, the initialization processing can include processing to set the oscillation stabilization interval of a clock signal generating circuit (in particular, the circuit which is the source of the machine clock, i.e., the operating clock signal of the CPU) to a specific value. When operation of the oscillator circuit of a clock signal generating circuit is restarted, a certain time duration must elapse before the oscillation operation becomes stabilized. Hence, a circuit which operates from a clock signal based on that oscillation signal must wait for a certain time interval after generation of the clock signal is restarted, before accurate operation can be ensured. With the present invention, the CPU will wait for the duration of an interval that is set in the initialization processing, before beginning essential processing, to thereby ensure that such processing will be accurately performed.

According to another aspect, a microcomputer according to the present invention can be effectively incorporated into a vehicle ECU (Electronic Control Unit). With a vehicle ECU, the range of initialization processing which must be performed is relatively limited, and in most cases, only a small part of the initialization processing requires values to be specified by a user, for a particular application. Hence, the present invention is highly suited to application to a vehicle ECU. Moreover, a high level of reliability of operation is required for a vehicle ECU, so that it is essential that initialization processing of the computer which controls a vehicle ECU be performed with complete accuracy. Thus, use of a microcomputer according to the present invention, having an initialization program for executing essential initialization processing stored in a boot ROM rather than as part of a user-prepared program, can ensure greater reliability of such a vehicle ECU.

BRIEF DESCRIPTION OF THE DRAWINGS

FIG. 4 is a diagram illustrating the contents of an initialization program which is stored in a boot ROM of the microcomputer embodiment;

FIGS. 5A, 5B are diagrams showing the bit configuration of an internal status register of the CPU of the microcomputer embodiment;

FIGS. 7A, 7B are diagrams showing the bit configuration of a system register,

FIGS. 8A, 8B are diagrams showing the bit configuration of a resource address access register;

DESCRIPTION OF PREFERRED
EMBODIMENTS

First Embodiment

Figure 17:
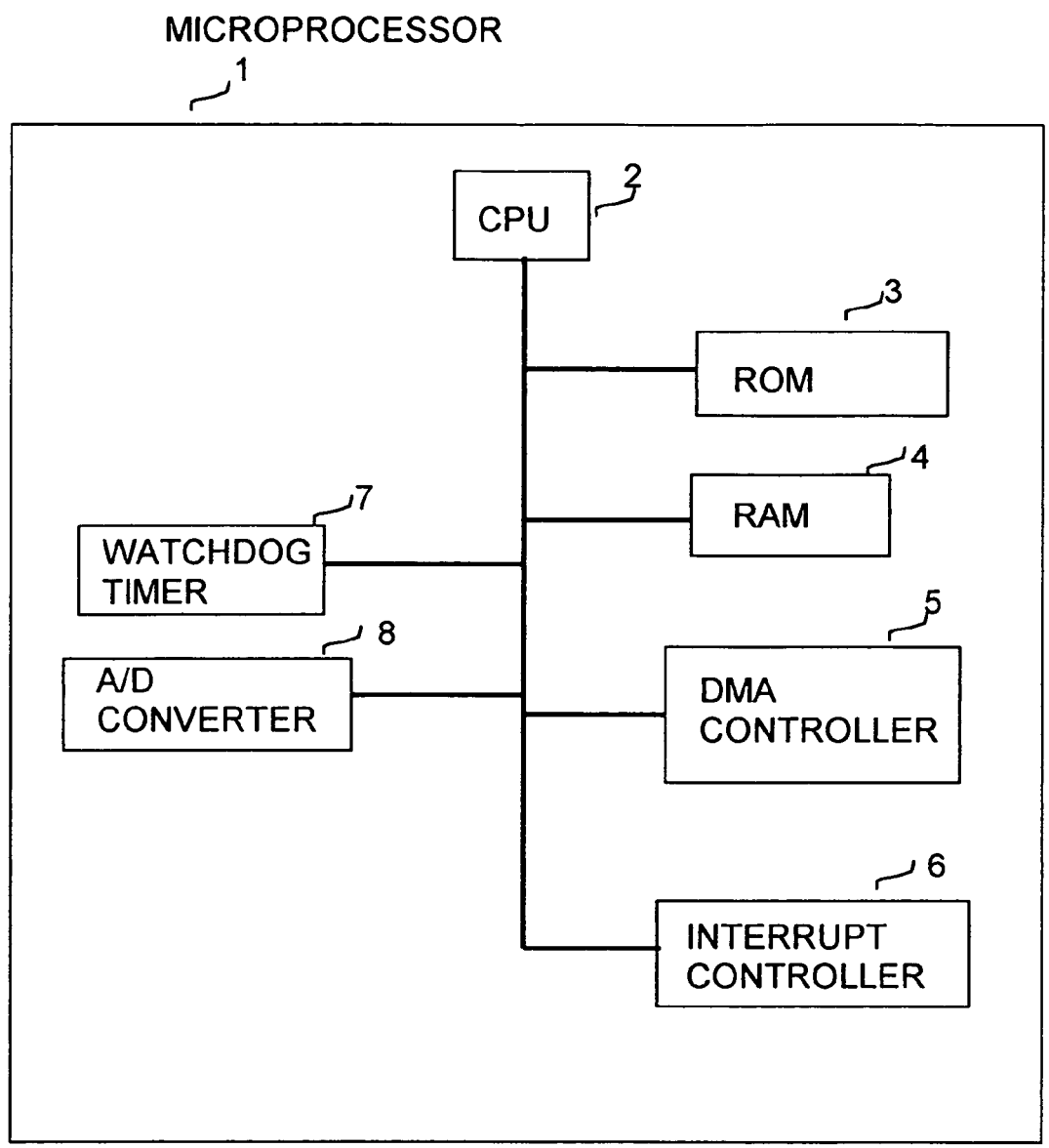
FIG. 17 is a functional block diagram of the basic elements of a prior art example of a microcomputer.

A first embodiment of a microcomputer used in a vehicle ECU, which controls an apparatus of a motor vehicle, will be described in the following referring to FIGS. 1 to 13A, 13B. Components shown in these drawings which are identical to components shown in FIG. 17 described above are indicated by corresponding reference numerals to those of FIG. 17, and further description of these will be omitted. FIG. 2 is a functional block diagram of a vehicle system which utilizes a body ECU 12 incorporating a microcomputer 11 according to the present invention. The vehicle system includes an engine ECU 13 which controls the vehicle engine, an air conditioner ECU 14 which controls the vehicle air conditioner, a door ECU 15 which controls opening and closing of the vehicle doors and locking/unlocking of these doors, and a panel ECU 16 which controls various meters and display lamps etc., of the vehicle instrument panel (i.e., dashboard). The body ECU 12 is connected for data communication with each of these ECU 13, ECU 14, ECU 15 and ECU 16, using a vehicle LAN (Local Area Network) communication protocol, and supplies various commands to the ECU 13, ECU 14, ECU 15 and ECU 16 in response to data received from these.

Figure 1:
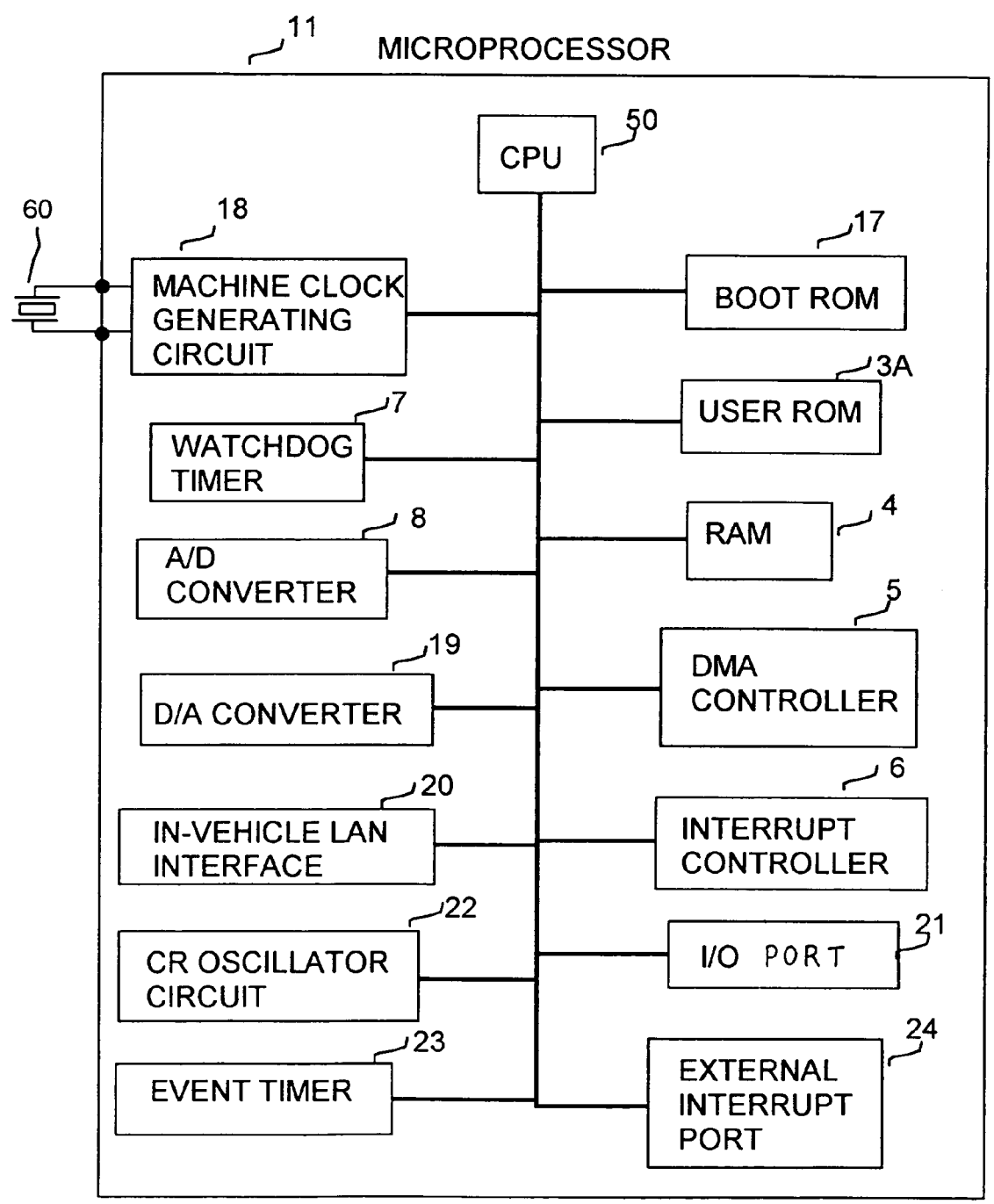
FIG. 1 is a functional block diagram of the electrical configuration of an embodiment of a microcomputer which is incorporated in a body ECU which controls an apparatus of a motor vehicle.
Figure 2:
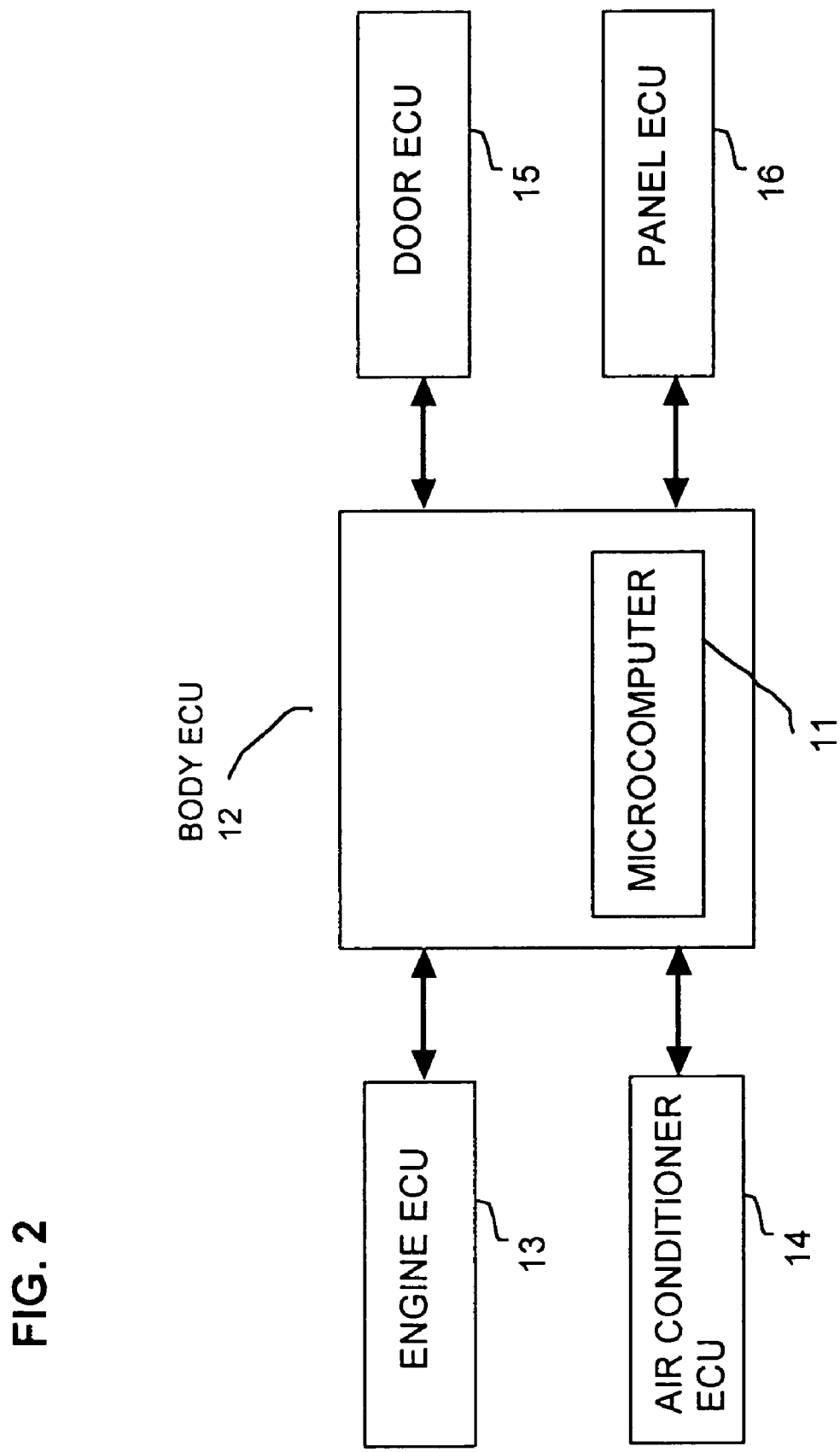
FIG. 2 is a general functional block diagram of a vehicle electrical system which incorporates the body ECU.

FIG. 1 is a general system block diagram of the microcomputer 11. The microcomputer 11 is based on a CPU 50 and includes, in addition to the DMA controller 5, interrupt controller 6, watchdog timer 7, and A/D converter 8 shown in FIG. 17, a user ROM 3A which corresponds to the ROM 3 of FIG. 17, and further includes a boot ROM 17, a machine clock generator circuit 18, a D/A converter 19, a in-vehicle LAN (Local Area Network) I/F (interface) 20, an I/O port 21, a CR oscillator circuit 22, an event timer 23, and an external interrupt input circuit 24.

The boot ROM 17 has stored therein an initialization program which is executed when operation of the CPU 50 is started, as described in detail hereinafter. The machine clock generator circuit 18 performs frequency multiplication of the oscillation frequency of an externally connected vibrator element 60 and applies the resultant signal in a PLL (Phase Lock Loop) to obtain a clock signal which will be referred to as the machine clock, which is supplied as the operating clock signal of the CPU 50 etc.

The machine clock generator circuit 18 is configured to be capable of being set in either of two low power consumption modes, i.e., a sleep mode and a stop mode, in which the CPU 50 is deactivated. Entry into one of these low power consumption modes is executed when it is detected that a certain value has been written into a particular internal register of the CPU 50, and when this occurs, generation of the machine clock is halted. After a predetermined time interval (for example, 1 to 2 seconds) has elapsed during the sleep mode, the sleep mode is automatically terminated, i.e., wake-up occurs, and the machine clock is again supplied to the CPU 50. In the case of the stop mode, the supply of clock signal to the CPU 50 is held halted until an external interrupt is directed to the CPU 50.

The D/A converter 19 converts a digital signal produced by the CPU 50 to an analog signal which is supplied to an external circuit. The vehicle internal LAN interface 20 is used for data communication between the body ECU 12 and the ECUs 13 and 16, etc. The I/O port 21 is used to transfer data between the body ECU 12 and external circuits.

The CR oscillator circuit 22 is an oscillator circuit which utilizes a CR element which is an on-chip element of the microcomputer 11. The oscillator output signal, for example having a frequency of 25 kHz, is supplied to a CR timer (not shown in the drawings), and in addition is supplied via a frequency divider circuit (not shown in the drawings) to a counter of the watchdog timer 7.

The event timer 23 is a timer which can be cleared in response to occurrence of an event which is generated external to the microcomputer 11. The external interrupt input port 24 receives interrupt signals that are generated external to the microcomputer 11.

In addition, although not specifically shown in the drawings, the microcomputer 11 includes a free run timer, a UART (Universal Asynchronous Receiver/Transmitter) for performing serial data communication, a clock synchronizing serial circuit, a PWM (Pulse Width Modulation) circuit which outputs a PWM signal, an input capture circuit which measures the duration of a change in condition of an externally supplied input signal (for example, the interval between high-to-low transitions of a pulse signal waveform), an output comparator circuit which generates an interrupt when a timer count value coincides with a value that has been written into a predetermined register, etc.

Furthermore, the body ECU 12 includes I/O buffers, relays, power supply circuits, etc., which are peripheral to the microcomputer 11.

Figure 3:
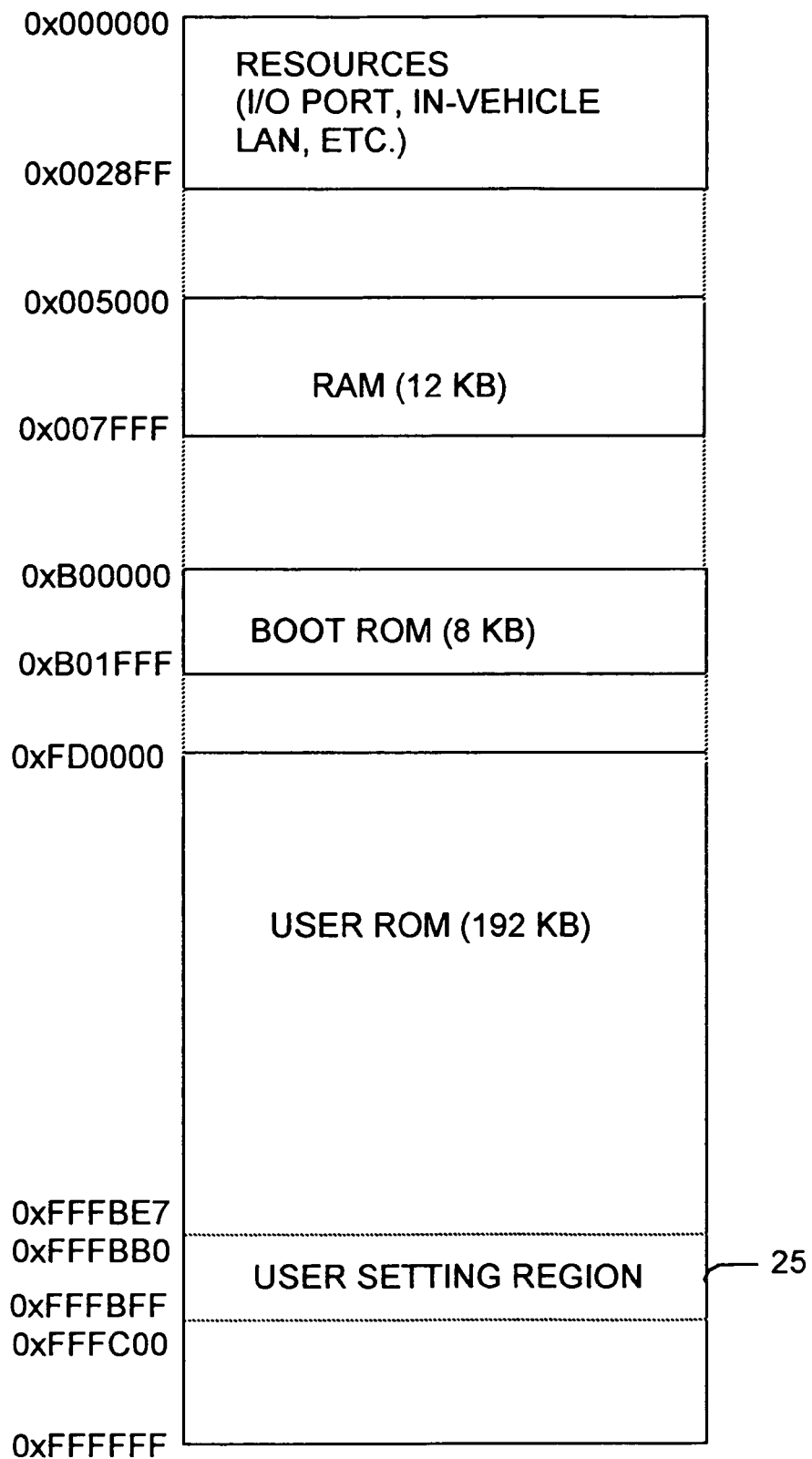
FIG. 3 shows an example of an address map of the microcomputer embodiment.

FIG. 3 is an address map of the microcomputer 11. The addresses from 0x00000 to 0x0028FF are allocated as a resource space for the in-vehicle LAN I/F 20 and the I/O port, etc., the addresses from 0x005000 to 0x007FFF are allocated to the RAM 4, the addresses from 0xB00000 to 0xB01FFF are allocated to the boot ROM 17, the addresses from 0xFD0000 to 0xFFFFFF are allocated to the user ROM 3A (i.e., in place of the ROM 3 of FIG. 17). In addition, the addresses from 0xFFFBB0 to 0xFFFBFF are allocated as a user setting region 25.

FIG. 4 shows the contents of the initialization program that is stored in the boot ROM 17, i.e., before the boot ROM 17 is supplied to a user. The user then stores a user program in the ROM 3A, to be executed by the microcomputer 11 for a specific application, with that user program having been prepared while taking into consideration the contents of the initialization processing contents of the program stored in the boot ROM 17.

FIGS. 5A, 5B illustrate the contents of the status register, which is an internal register of the CPU 50. In FIG. 5A, bits at positions indicated by "1" are each fixedly held in the "1" logic state. FIGS. 7A, 7B illustrate the contents of the system register 32. In FIG. 7A, the bit at the position indicated by "0" is fixedly held in the "0" logic state. FIGS. 8A, 8B illustrate the contents of the resource address access error register 33. which is an internal register of the CPU 50.

The initialization program is executed immediately after the CPU 50 is released from the reset state, or when operation in the stop mode or the sleep mode is terminated. The actual contents of the initialization program will depend upon the particular type of application that is to be executed by the user program. More specifically, there is one part of the initialization processing which must be performed, irrespective of the application of the user program, and another part which may only be required for some types of application. With the present invention, in the case of the first of these two parts of the initialization processing, no modification can be performed by a user. Respective fixedly predetermined values are set, e.g., as initial contents of specific registers, etc. However in the case of the second part of the initialization processing, which is not essential for all applications, a user can alter the initialization processing contents, by writing appropriate data values (referred to herein as user-selected set values) into the user setting region 25.

As shown in FIG. 4, immediately after the reset condition has been released, the following processing must be executed in all cases, i.e., irrespective of the intended user application, and does not contain any user-selected functions: interrupt inhibit; clearing of zero register; clearing the SYS flags; clearing the resource address access error flags The above processing will be briefly described in the following.

(Requisite Setting Operation 1) Interrupt Inhibit

This is processing whereby the CPU 50 is inhibited from responding to external interrupts, until various setting operations relating to interrupt processing have been completed.

As shown in FIGS. 5A, 5B, this inhibit is implemented when the 4-th bit (the i flag) of the internal status register 31 of the CPU 50 is set to "1".

(Requisite Setting Operation 2) Clearing of Zero Register

This is processing to clear the contents of the internal general-purpose register R0 of the CPU 50 to the all-zero condition. The contents of the register R0 are used as a pointer to the addressing mode "register displacement: 16 bits", when the CPU 50 accesses a register etc., of a resource (such as a peripheral circuit). Normally this register is held in the all-zero state.

Figure 6:
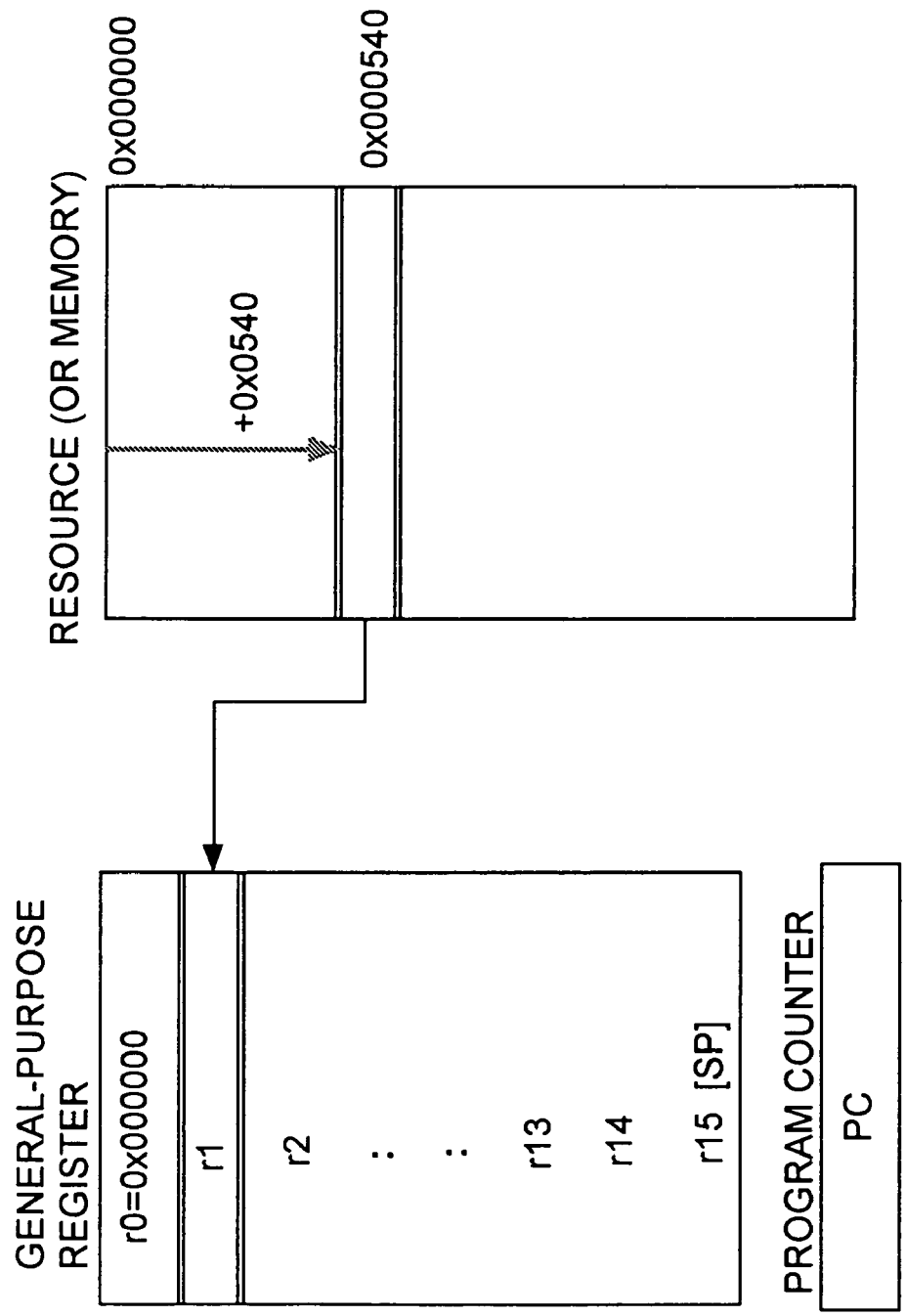
FIG. 6 is a conceptual diagram for illustrating how an internal register r0 of the CPU is used as an address pointer, for indirect addressing using a register displacement.

For example, in the example shown in FIG. 6, it is assumed that the instruction mov.1 @ (0x0540,r0),r1 is executed under the condition that "r0 =0x000000". In that case, the value held in the external register which is assigned the address 0x0540 is read out and written into the general-purpose register r1.

(Requisite Setting Operation 3) Clearing of SYS Flags

The SYS flags are expressed by the contents of the system register 32, and indicate occurrence of reset, address boundary error, undefined operating code error, etc. Thus it is necessary to reset all of these flags during initialization processing, so that any subsequent occurrence of these various error conditions can be detected. As shown in FIGS. 7A, 7B, the SYS flags of this embodiment are respectively designated as EOP, EAD and MON, which are the bits 3~1 of the system register 32, and are cleared by writing "0" into each of these bits in the initialization processing.

(Requisite Setting Operation 4) Clearing Resource Access Error Flags

A resource access error occurs when it is attempted to access an address which has not been assigned to a corresponding resource (i.e., addresses within the blank regions of the memory map shown in FIG. 3). Thus it is necessary to clear the resource access error flags in the initialization processing, so that subsequent occurrence of such errors can be detected. As shown in FIGS. 8A, 8B, the resource access error flag is implemented as bit 0 (referred to as the error bit MACCERR) of the resource access error register 33, which is an internal register, with "0" being written into that bit in the initialization processing.

With this embodiment, when an address boundary error, an undefined operating code error, or a resource access error occurs, then a NMI (Non Maskable Interrupt) is applied to the CPU 50.

The initialization processing described above is processing which must be executed in all cases, before the CPU 50 can begin execution of a user program, i.e., are not altered in accordance with the particular application which is envisaged by the user for the body ECU 12.

However in addition to the above initialization processing, the user can selectively perform setting of values relating to other initialization processing, as follows: setting the duration of oscillation stabilization interval; setting of lower limit value for watchdog timer; setting of upper limit value for watchdog timer; setting of clock signal source for watchdog timer. These will be described in the following.

(User-Selected Setting Operation 1) Setting Duration of Oscillation Stabilization Interval The oscillation stabilization interval is the time that is required before processing can begin to be executed, after the start of oscillation operation of the vibrator element 60 which is connected the machine clock generator circuit 18, i.e., an interval which must elapse before the oscillation of the vibrator element 60. (and hence, the frequency of the machine clock) has stabilized.

That is to say, operation of the machine clock generator circuit 18 is halted while the microcomputer is set in the sleep mode or the stop mode. Immediately following wake-up from the sleep mode or stop mode, operation of the clock signal generating circuit 18 is started, however the operation (i.e., oscillation frequency) of the vibrator element 60 is unstable during a certain interval following that start of operation of the clock signal generating circuit 18, with that interval being referred to herein as the oscillation stabilization interval. The duration of the oscillation stabilization interval is measured based on a 4 MHz oscillation signal obtained by frequency multiplication of the output signal from the CR oscillator circuit 22.

(User-Selected Setting Operation 2) Setting of Upper Limit/Lower Limit Value of Watchdog Timer The watchdog timer is used to detect a condition whereby execution of a program has entered an endless loop. During normal operation of a program, the watchdog timer performs continuous-counting of a clock signal, and at successive points in the progress of execution of a program, the CPU clears the count to zero. If the program operation is normal, then the count values attained by the watchdog timer will be within a predetermined range, i.e., between an upper limit count (corresponding to an upper limit period, i.e., the interval which elapses between a clear operation and the point at which the count subsequently reaches the upper limit count) and a lower limit count (corresponding to a lower limit period) as described hereinafter. Respective values for the upper limit count and lower limit count can be specified by the user, in this operation. These values are determined such that, if the count of the watchdog timer is cleared before reaching the lower limit count then this indicates that program execution has entered an endless loop having a short-duration period, corresponding to the condition illustrated in FIG. 9B in which each occurrence of clearing the watchdog timer is within the loop, while if the watchdog timer is cleared at a count value which is above the upper limit count then this indicates that the program execution has entered an endless loop having a long-duration period, corresponding to the condition illustrated in FIG. 9A, in which the loop does not include any occurrence of clearing the watchdog timer.

(User-Selected Setting Operation 3) Setting the Clock Signal Source of Watchdog Timer The watchdog timer 7 operates by counting a clock signal from a clock signal source constituted by a frequency divider which operates on the oscillation signal from the CR oscillator circuit 22. This setting function enables the frequency of clock signal from that clock signal source to be set, by selecting the frequency division ratio, e.g., as 1:1, 1:2, 1:4, etc.

Figure 10:
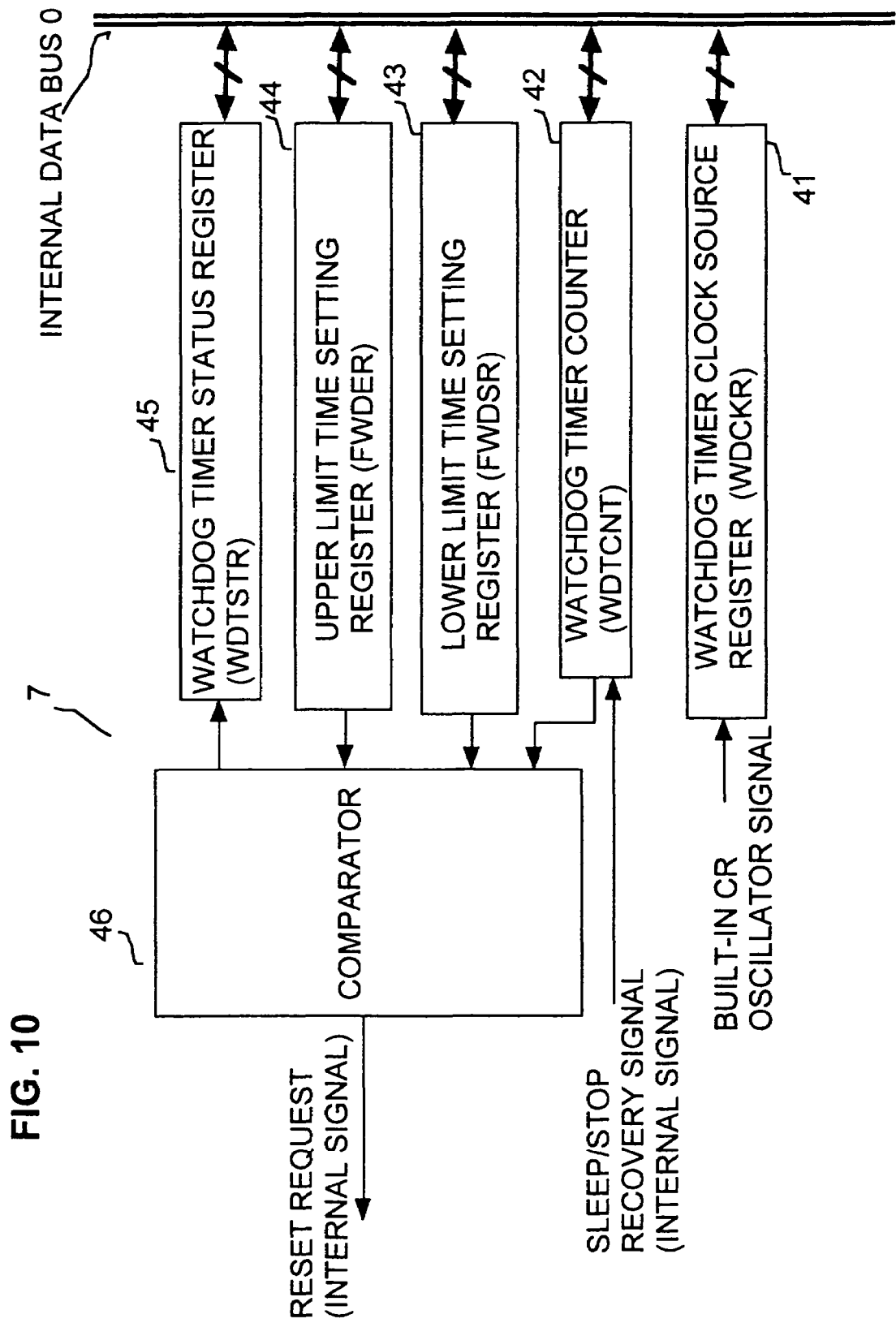
FIG. 10 is a functional block diagram of a watchdog timer.

The watchdog timer 7 will be described in greater detail in the following, referring to FIGS. 10 and 11. FIG. 10 is a functional block diagram showing details of the configuration of the watchdog timer 7, which includes a watchdog timer clock source register 41, a watchdog timer counter 42, a lower limit period setting register 43, a upper limit period setting register 44, a watchdog timer status register 45, and a comparator 46. The watchdog timer clock source register 41 functions as a frequency divider which performs frequency division of the oscillation signal from the CR oscillator circuit 22 to produce an output clock signal, and is configured such that the frequency division ratio is determined by a value which is specified in the setting operation (3) described above. The watchdog timer counter 42 performs counting based on the output clock signal from the watchdog timer clock source register 41. The lower limit period setting register 43 and the upper limit period setting register 44 have respectively stored therein the aforementioned lower limit count (FWDSR) and upper limit count (FWDER) of the watchdog timer, which are set in the setting operation (2) described above, to thereby respectively set the lower limit period (extending from the timing of release from the cleared condition until the count FWDSR is reached) and the upper limit period (extending from the timing of release from the cleared condition until the count FWDER is reached) of the watchdog timer 7.

The comparator 46 compares the count value attained by the watchdog timer counter 42 with the respective values held in the lower limit period setting register 43 and upper limit period setting register 44. During execution of a program, if the program is being executed normally, the count of the watchdog timer counter 42 will be repetitively cleared by the CPU 50, with each clearing operation occurring after the count value has exceeded the lower limit count (FWDSR) but has not reached the upper limit count (FWDER). This is illustrated in the timing diagram of FIG. 11, in which such a normal clearing of the count is indicated by the letter A. However if the watchdog timer status register 45 detects that clearing of the count value has occurred at a value which is below the lower limit count (FWDSR), as indicated by the letter B in FIG. 11, or is above the upper limit count (FWDER), as indicated by the letter C, then this indicates that program execution has entered an endless loop, and so a reset request signal is sent to the CPU 50.

The watchdog timer status register 45 is a register whose contents indicate the source of a reset request from the watchdog timer 7.

Counting operation by the watchdog timer 7 is started when the reset state of the CPU 50 is released. As described above, the CPU 50 is configured such that during execution of a user program, the count value of the watchdog timer counter 42 is cleared at each of successive points in the program execution. It is arranged that while the user program is being executed normally, each such clearing operation will occur when the count value of the watchdog timer counter 42 is within the range between the lower limit count (FWDSR) and upper limit count (FWDER), e.g., the clearing operation "A" in FIG. 11. However if as illustrated in FIG. 9B a clearing operation occurs within an endless loop, then clearing of the watchdog timer counter 42 will be performed before the lower limit count (FWDSR) has been reached, e.g., the clearing operation "B" in FIG. 11, referred to as watchdog timer underflow. A reset request for the CPU 50 will thereby be generated.

Figure 9A:
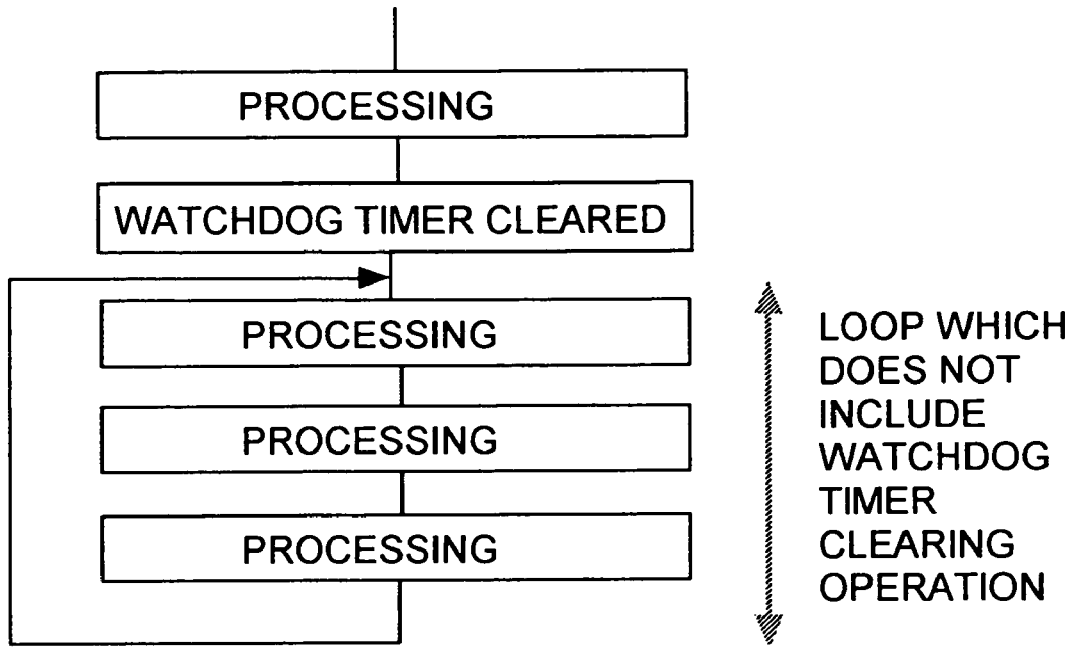
FIG. 9A is a diagram illustrating the execution of a program which contains an endless loop that does not include the occurrence of a watchdog timer clearing operation.
Figure 9B:
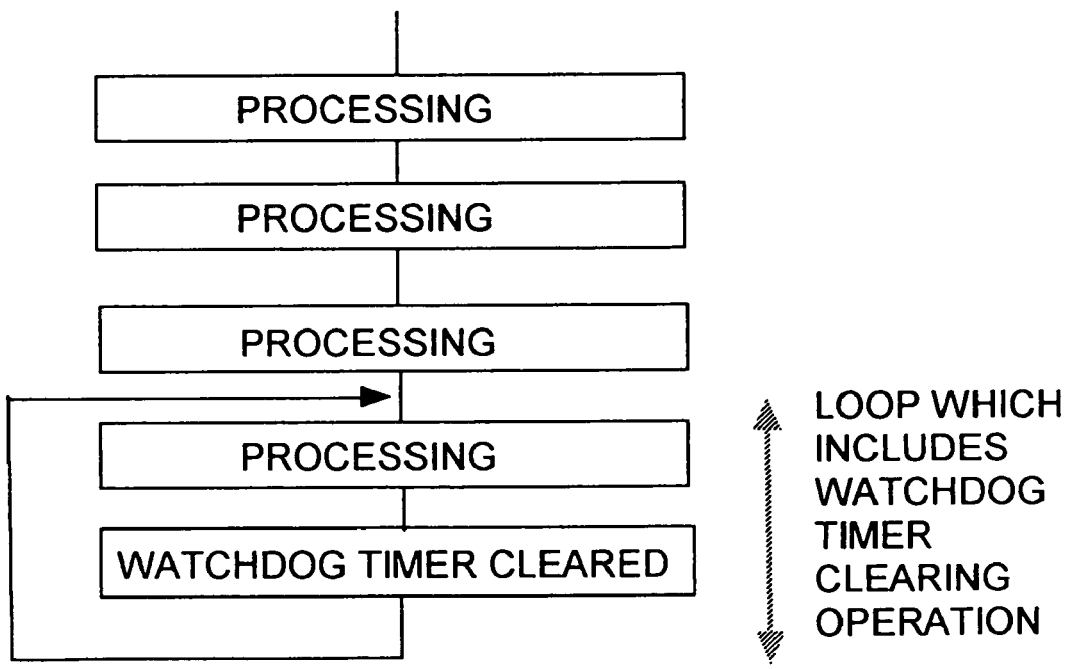
FIG. 9B is a corresponding diagram of a program in which an endless loop includes the occurrence of a watchdog timer clearing operation.
Figure 11:
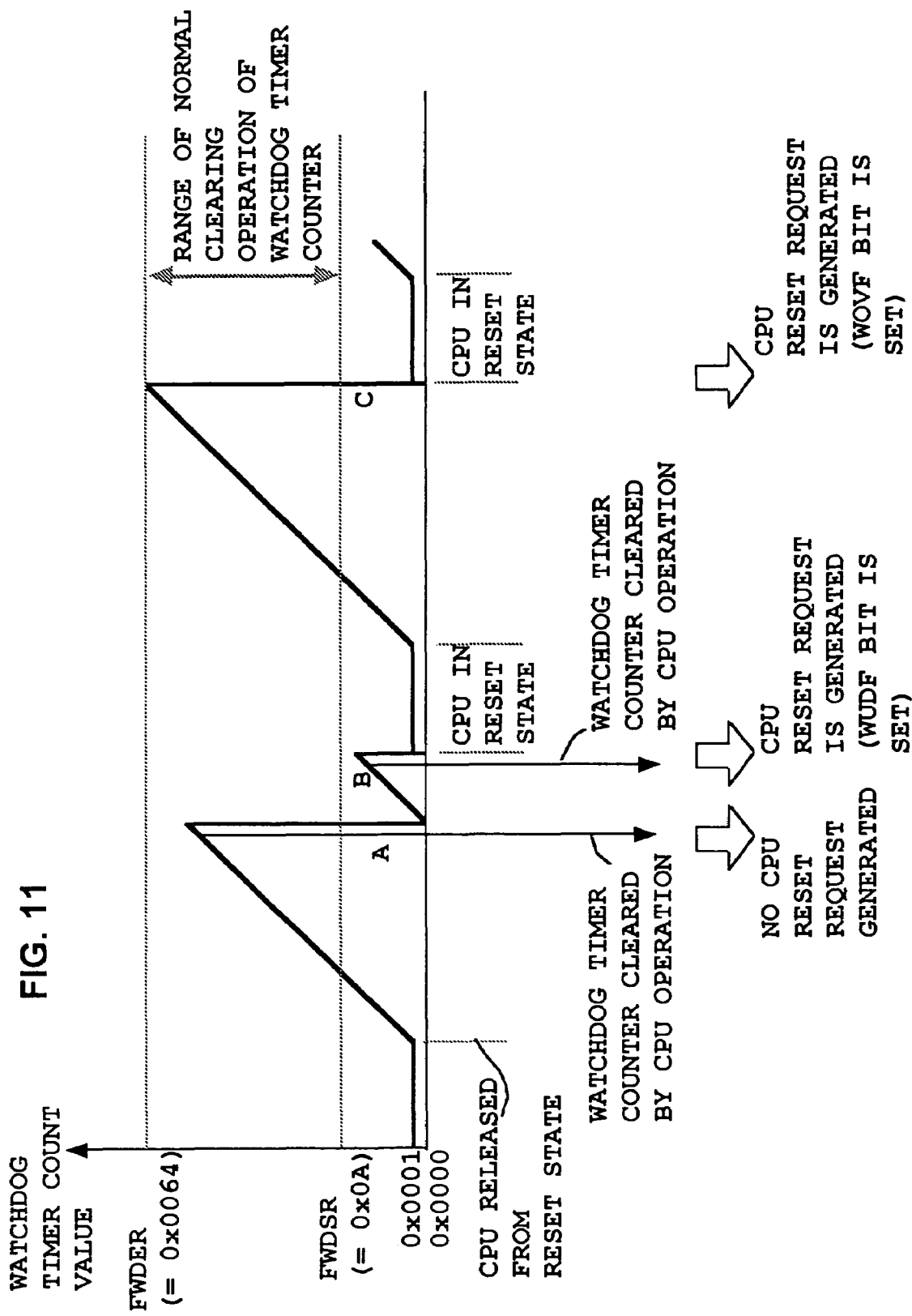
FIG. 11 is a timing diagram illustrating the counting and clearing operations of a watchdog timer.

Conversely, as illustrated in FIG. 9A, if the endless loop does not include a watchdog timer clearing operation, then counting by the watchdog timer will continue until the upper limit count (FWDER) is reached, and the clearing operation "C" in FIG. 11 will occur, (referred to as watchdog timer overflow). A reset request for the CPU 50 will thereby be generated.

If a user requires to perform one or more of the user-selected operations (1) to (3) above, this is achieved by writing data (i.e., one or more set values) into the aforementioned user setting region 25 that is allocated in the user ROM 3A. Default values are automatically assigned in place of any set values which are not specified by a user. Even if set values are not initially specified by the user, it is of course possible for the user to subsequently specify one or more of these set values, by the user-selected setting operations, or to change one or more set values which were previously specified.

Immediately after each "wake-up" of the microcomputer 11 occurs, it is necessary for the CPU 50 to execute the interrupt inhibit processing, and to write the upper and lower limit counts for the watchdog timer 7 into the upper and lower limit registers 44 and 43 respectively (i.e., assuming that set values for these have been specified by the user). This rewriting of the limit counts is necessary, because it is possible that the contents of the upper and lower limit registers 44, 43 might become erroneous while the CPU 50 is inactive, due to electrical noise affecting the microcomputer 11 while it is in the sleep mode or the stop mode. Rewriting of the set values when "wake-up" occurs therefore provides enhanced reliability.

Figure 12:
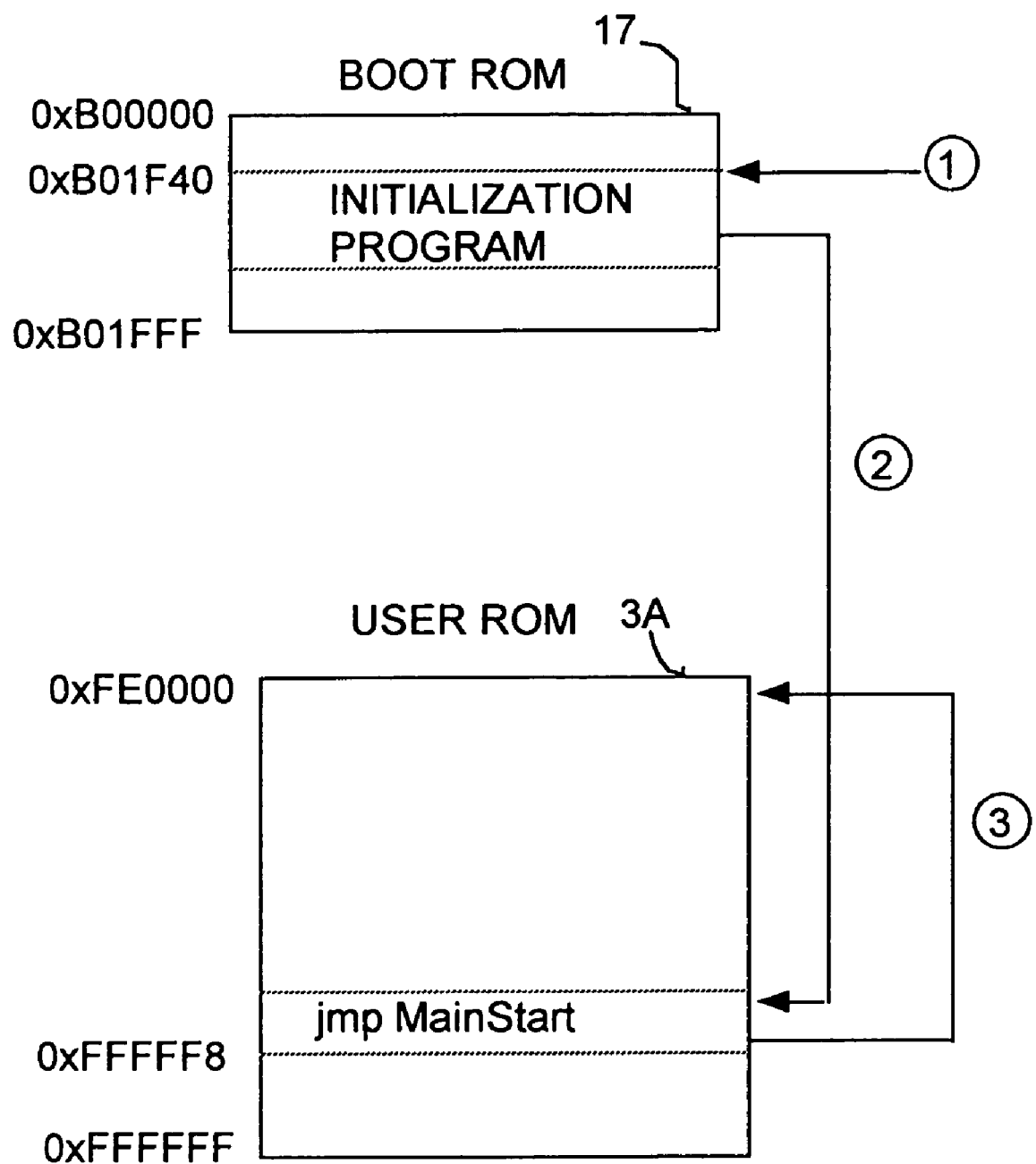
FIG. 12 is a conceptual diagram for illustrating a process whereby execution of a user program is started upon completion of execution of an initialization program stored in a boot ROM.

The overall operation of this embodiment will be described referring to FIGS. 12 and 13A, 13B. FIG. 12 is a conceptual diagram, illustrating the processing sequence that is executed when the reset state of the microcomputer 11 is released, and the CPU 50 accesses the boot ROM 17 and the user ROM 3A.

When reset is released, the internal program counter of the CPU 50 is set to the address 0xB014F0 in the boot ROM 17 (indicated by the circled numeral 1 in FIG. 12). The CPU 50 then executes the initialization program which is stored in the boot ROM 17. At this time, during execution of the initialization program, the CPU 50 accesses the user setting region within the user ROM 3A, and judges whether data have been written into that region as one or more set values which have been specified by the user. If such data have been written into the user setting region, then the CPU 50 performs setting of the corresponding parameters, e.g., the oscillation stabilization interval duration, and/or the limit counts and clock source setting for the watchdog timer 7, using the respective set values which are read out from the user setting region. The boot ROM 17 has stored therein respective default values for these parameters. If any user-selected set value is omitted from being written into the user setting region 25, then a default value is applied as that set value.

When initialization processing has ended, the CPU 50 branches (2) to the address 0xFFFFF8, which is the reset vector address in the user ROM 3A. That address stores an instruction (jmp MainStart) designating that execution is to branch to the leading address of the user program. This branching is then performed (3) and execution of the user program begins.

Figure 13A:
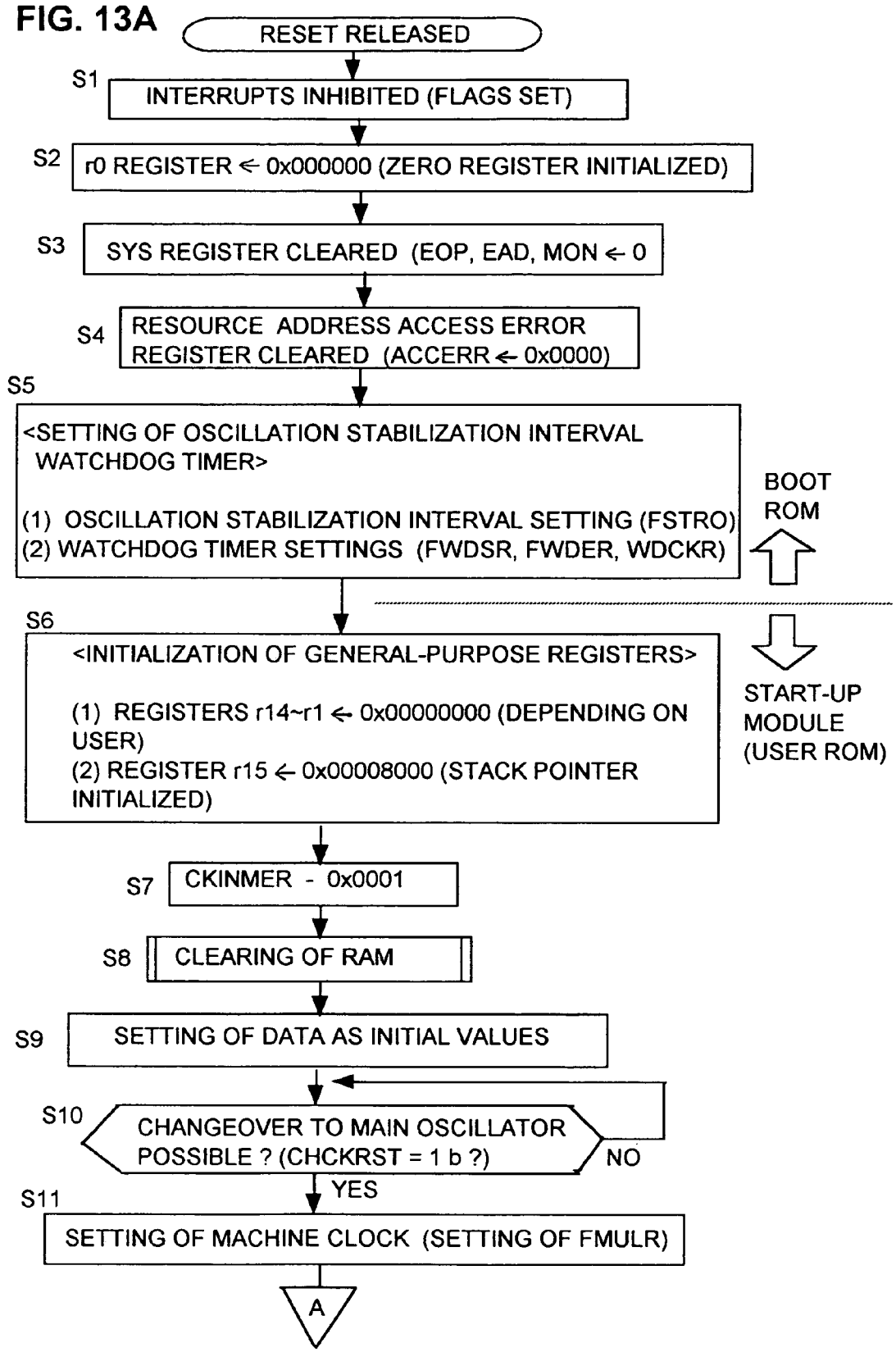
FIGS. 13A, 13B constitute a flow diagram illustrating the processing contents of an initialization program which is stored in a boot ROM, and of a start-up module and an initialization routine contained in a user program, which are successively executed subsequent to the initialization program.
Figure 13B:
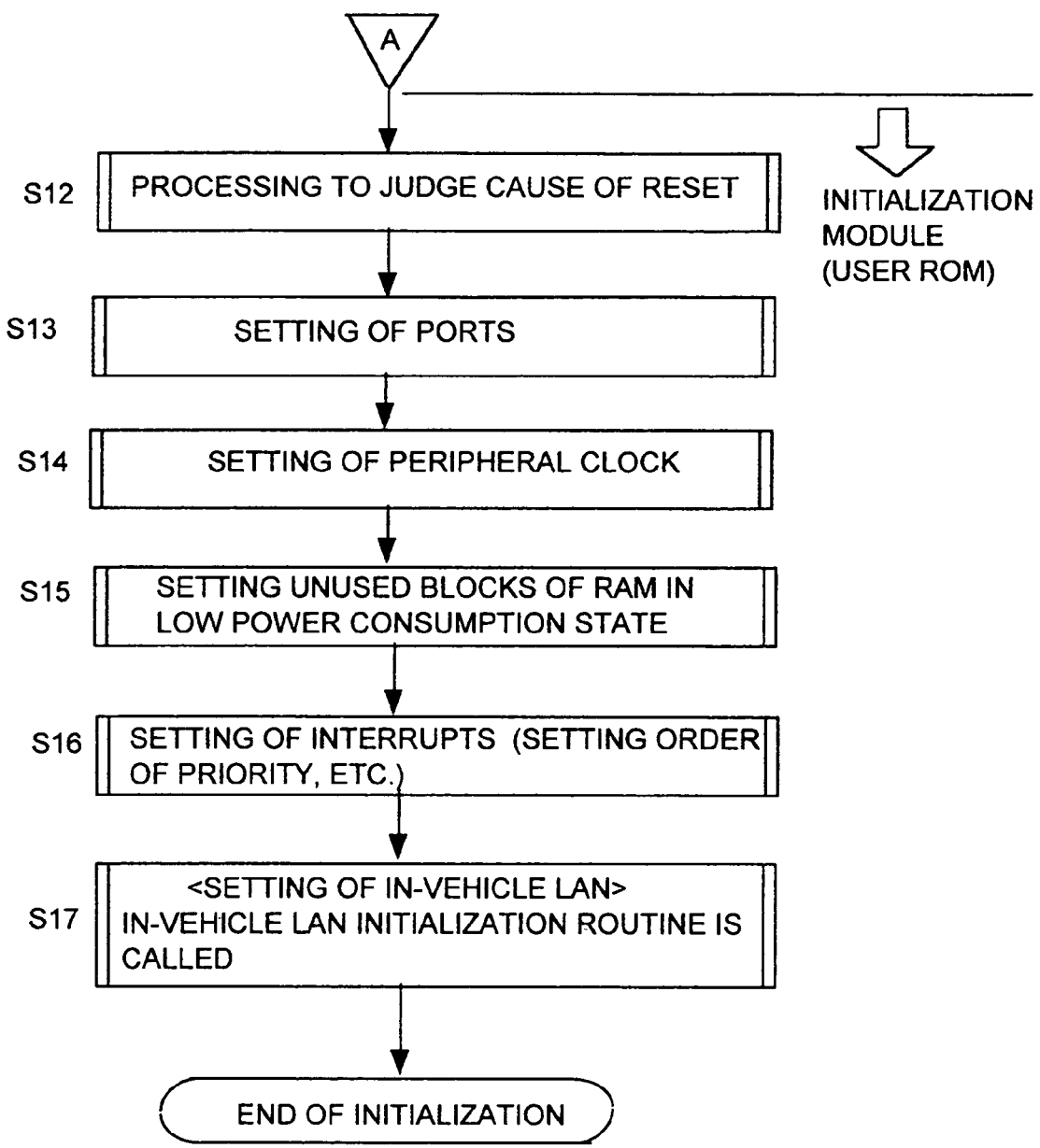

FIGS. 13A, 13B constitute a flow diagram illustrating the processing contents of the initialization program stored in the boot ROM 17, and also of examples of a start-up module and an initialization module of the user program, which are successively executed upon completion of executing the initialization program stored in the boot ROM 17. Steps S1 to S6 constitute the initialization program stored in the boot ROM 17, with step S5 consisting of processing that is executed in accordance with the aforementioned user settings.

The user program is executed in step S6 and subsequent steps. S6 to S11 constitute the start-up module, in which the general-purpose registers R1 to R14 of the CPU 50 are cleared to zero, while the contents of the general-purpose register 15 (used as the stack pointer) are initialized to the appropriate contents. In addition, the contents of the register CKINMER are set to 0x0001, to enable user reset to be performed if the oscillation operation of the vibrator element 60 of the machine clock generating circuit 18 becomes abnormal. Furthermore the entire memory area allocated as RAM 4 is cleared, and initialization is performed of any other required data values.

In step S10, the operation waits until the oscillation stabilization interval has elapsed. When the value in the register CHCKRST becomes "1", indicating that the oscillation stabilization interval has elapsed, a "YES" decision is made, and the machine clock generator circuit 18 is set such as to determine the frequency of the machine clock (step S11) Steps S12 to S17 constitute the initialization module. It should be noted that the distinction made herein between the start-up processing and the initialization processing contents of the user program is for ease of understanding. In the initialization module, the causative factors for reset are judged, referring to the conditions of respective status registers, while in addition the condition of the I/O port and of the peripheral clock are set, and setting of low power consumption for unused blocks of memory and setting of the interrupt controller 6 and also of the in-vehicle LAN I/F 20 are also performed.

When all of the above initialization processing has been completed, execution of an application program then begins.

Figure 14:
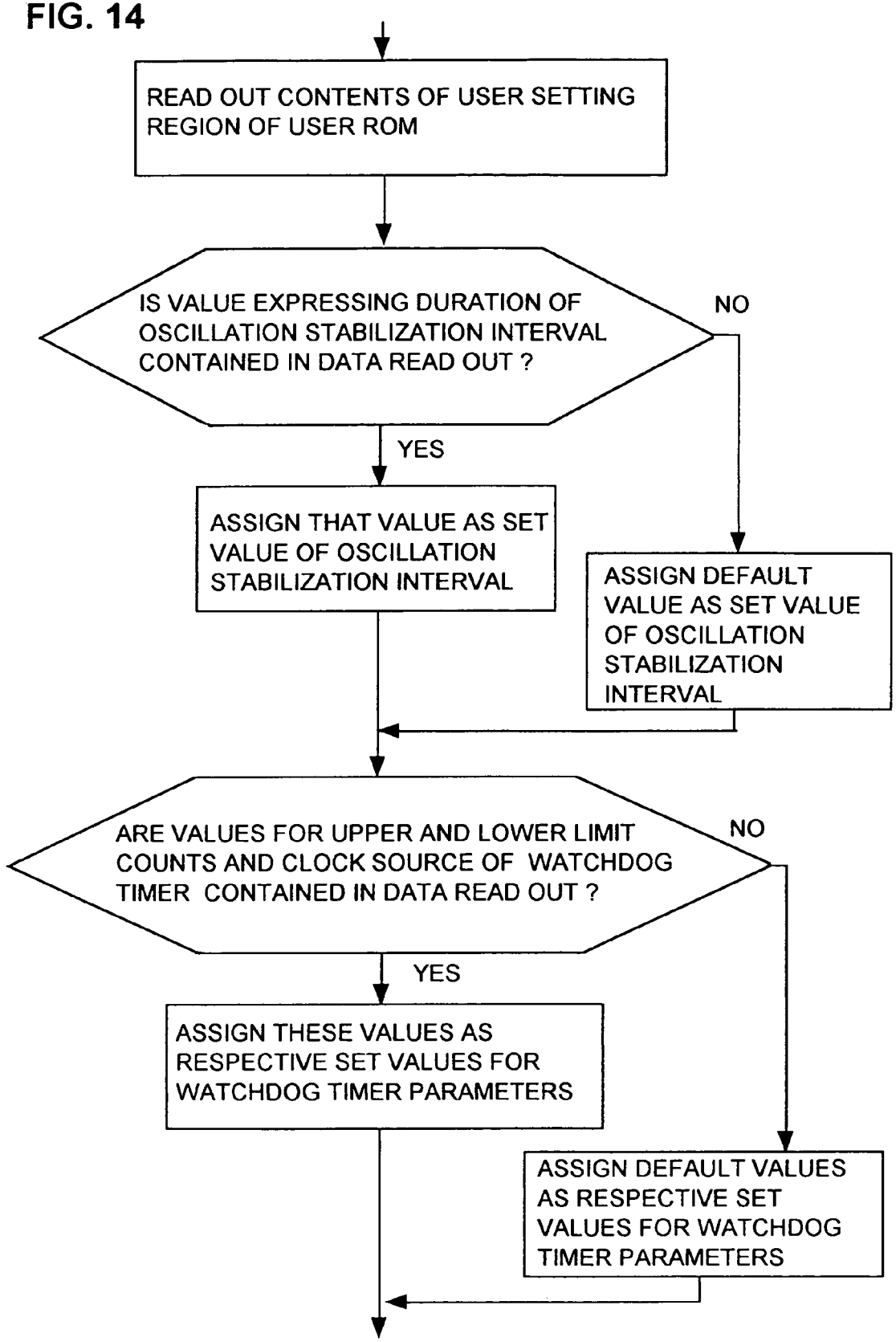
FIG. 14 is a flow diagram showing details of a setting step S5 in the flow diagram of FIGS. 13A, 13B.

FIG. 14 is a flow diagram illustrating the contents of step S5, in which the contents of the user setting region 25 are read out, and the duration of the oscillation stabilization interval and the upper and lower limit count values for the watchdog timer are set, with default values being assigned to replace any user-selected set values that have been omitted from being written into the setting region 25

With this embodiment, each time that wake-up from the sleep mode or stop mode or release from reset of the CPU 50 is performed, that part of the initialization processing shown in the flow diagram of FIG. 13 which is necessary for restarting operation of the microcomputer is executed.

Furthermore, the processing of steps S1 to S5 shown in FIG. 13, i.e., processing whose contents are stored in the boot ROM 17, is executed immediately after the wake-up or release from reset occurs. Since step S10 represents a point in the processing sequence that immediately precedes the end of the aforementioned oscillation stabilization interval, it is clear that the initialization processing of steps S1 to S5 is executed during that interval, i.e., while the operation of the vibrator element 60 is unstable.

In the prior art, such as is described in Japanese patents 2579419, 2939003 and 10-48481, the initialization processing which is executed after release of a microcomputer CPU from the reset state is not executed until after the oscillation operation of the vibrator element has stabilized. Thus, during the oscillation stabilization interval, proper functioning of the microcomputer cannot be reliably ensured, so that there is a danger that operating errors may occur.

Figure 15:
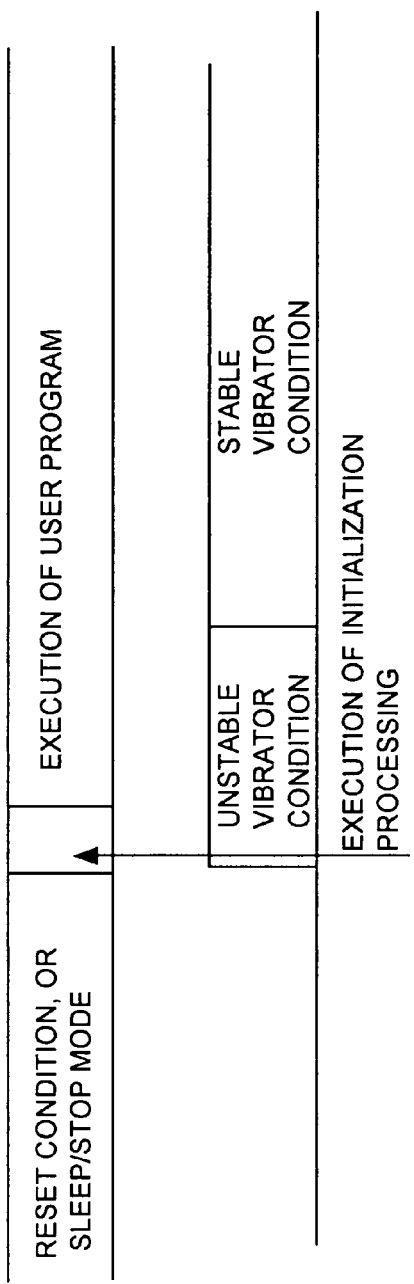
FIG. 15 is a conceptual timing diagram for illustrating the execution of initialization processing during a period of unstable operation of a vibrator element of a clock signal generating circuit.

However with the present invention, as illustrated in the timing diagram of FIG. 15, initialization processing is executed during the oscillation stabilization interval of the vibrator element 60, immediately following wake-up from the sleep mode or stop mode, or release from the reset state of the CPU 50. Hence, the possibility of operating errors occurring is made extremely small.

Furthermore, due to manufacturing deviations of vibrator elements, there may be substantial variations in the duration of the interval of unstable operation, between different vibrator elements. However with this embodiment, since initialization processing is executed immediately following release from the reset state, or wake-up from the stop mode or sleep mode, it is ensured that the initialization processing will always be executed during that interval of unstable operation, irrespective of variations in the duration of that interval due to manufacturing deviations.

Moreover with the embodiment described above, when the reset condition of the CPU 50 of the microcomputer 11 is released, the boot ROM 17 is accessed before execution of the user program stored in the user ROM 3A begins. Thus, a substantial part of the initialization processing that is necessary for executing the user program is performed, prior to the start of executing the user program. Hence, the need for the user to insert initialization processing into the user program is substantially reduced, so that preparation of the user program is simplified. Moreover, since the providing of those parts of the initialization processing which are essential is not left up to the user, enhanced reliability of operation can be achieved. Furthermore, it becomes unnecessary for the user to perform debugging of program portions relating to such initialization processing. Thus, the process of final development, after a program has been generated, can be shortened.

Furthermore with the above embodiment it is possible for the user to set values for use in the initialization processing performed by the initialization program stored in the boot ROM 17. As a specific example, in the course of executing the initialization processing, the contents of the user setting region 25 of the user ROM 3A are read out, and user-selected values which have been written into that register are used as set values by the CPU 50. Hence, the user can cause desired types of initialization to be performed, by the initialization program stored in the boot ROM 17, by writing appropriate data into the user setting region 25.

Moreover, when the CPU 50 terminates operation in a low power consumption mode such as a sleep mode or stop mode, it accesses the boot ROM 17 and thereby executes that part of the initialization processing which is essential for restarting operation. Thus, the microcomputer 11 can be configured such that low power consumption modes of operation can be effectively utilized.

As a specific examples of initialization processing that would be performed by the initialization program of the boot ROM 17, there is interrupt inhibit processing, and the initialization of internal registers of the CPU 50. That is to say, such initialization processing preferably consists of processing that must always be executed prior to beginning an application program, irrespective of the particular application program. By storing such essential initialization processing in the boot ROM 17, the burden of program preparation imposed on the user can be substantially reduced.

Furthermore with the above embodiment, the initialization processing executed by the initialization program of the boot ROM 17 includes setting the period and the clock source (i.e., the frequency division ratio of the clock source register 41) of the watchdog timer 7, so that when the watchdog timer 7 is to be used to monitor the operation of the CPU 50, the burden of program preparation that is imposed on the user is further reduced.

In addition, the processing executed by the initialization program of the boot ROM 17 includes setting the oscillation stabilization interval for the machine clock generator circuit 18. Thus, the time for which operation must wait until oscillation of the vibrator element 60 has stabilized, following the start of operation by the machine clock generator circuit 18, is automatically set. Since the CPU 50 is thereby caused to wait until the vibrator element 60 has stabilized, these circuits which operate based on the machine clock will function reliably and accurately.

With the above embodiment, the initialization program stored in the boot ROM 17 is configured such that when the CPU 50 reads out the contents of the setting region 25 of the user PROM 3A, a judgement is made (for each of the possible user-selected set values) as to whether a user-selected set value has been written into the corresponding address in the setting region 25. If any user-selected set value has been omitted from being written into the setting region 25 (for example, an address predetermined as corresponding to a user-selected set value does not contain data which are valid as a set value), then a corresponding default set value is used in the initialization processing.

In that way, it becomes possible for a user to modify the contents of the initialization processing not only by writing into the setting region 25 respective user-selected set values which will be used in the initialization processing, but also by selectively omitting to write one or more of the user-selected set values into the setting region 25. That is to say, by omitting to write in a set value, it is ensured that a known default value will be used, in the initialization processing.

With the above embodiment, the microcomputer 11 is incorporated in a vehicle ECU, to control an apparatus of a motor vehicle. There is only a limited range of initialization processing that is required for a vehicle ECU, and hence, it is unlikely that a user would have to perform independent setting of initialization values. Hence, the present invention is especially suited for use in an ECU of a motor vehicle.

Moreover, a high level of reliability is required for such a vehicle ECU, and hence it is essential to achieve a high degree of reliability of executing the initialization processing of the microcomputer 11 of such an ECU. With the present invention, the essential initialization processing is automatically executed by a program which has been stored in the boot ROM 17, and hence a high level of reliability can be ensured for the ECU 12.

Furthermore, since initialization processing is executed immediately following release from reset or termination of the sleep mode or stop mode, during the interval of unstable operation of the vibrator element which functions as a frequency reference for generating the operating clock of the CPU, the possibility of operating errors arising during that interval of unstable operation is made small. The reliability of operation of the microcomputer is thereby enhanced.

Moreover as described above there can be substantial variations in the duration of the interval of unstable operation, between different vibrator elements, due to manufacturing deviations. However with the above embodiment, since initialization processing is executed immediately following release from the reset state, or wake-up from the stop mode or sleep mode, it is ensured that the initialization processing will always be executed during that interval in which the vibrator element has not yet reached a stable oscillation condition.

Second Embodiment

Figure 16:
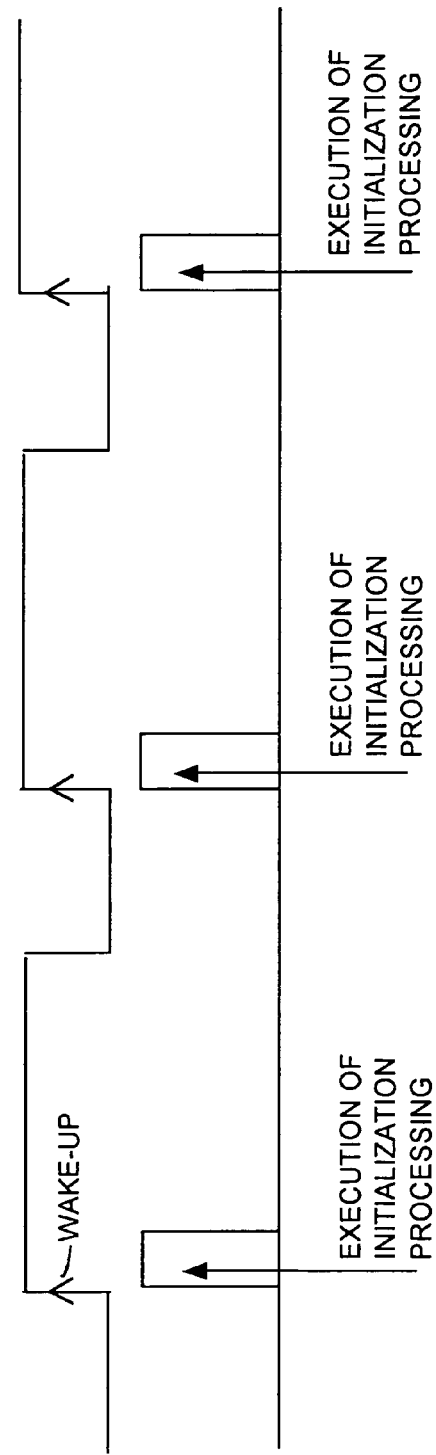
FIG. 16 is a conceptual timing diagram for illustrating periodic execution of a low power consumption mode of operation during a normal mode of operation, with a second embodiment.

FIG. 16 is a conceptual timing diagram for describing the operation of a second embodiment. Only the points of difference between this and the first embodiment will be described in the following. With the second embodiment, the user program is configured such that while the microcomputer 11 is operating in the normal mode, the sleep mode is periodically entered, with a fixed repetition period. That is to say, operation in the normal mode is periodically interrupted by brief intervals of operation in the sleep mode, as illustrated in FIG. 15.

By configuring the user program in that way, since initialization processing is executed each time that wake-up from the sleep mode occurs, it is ensured that initialization processing will be periodically executed at regular interval while the microcomputer 11 is functioning in the normal mode. When the microcomputer 11 is operated in an environment in which there is a high possibility of induced electrical noise, the noise can result in problems such as causing a program to run incorrectly, writing of incorrect data into internal registers, causing changes in signal levels at output terminals, etc. However with this embodiment, since initialization processing is periodically executed at regular intervals, the adverse effects of such an operating environment can be substantially overcome.

Hence, the reliability of operation of the microcomputer 11 in such an environment can be significantly increased.

It should be noted that the present invention is not limited to the embodiments described above, but that various alternative or extended configurations could be envisaged. For example, the initialization program stored in the boot ROM 17 could be configured to initialize the general-purpose registers R1 to R14, etc., or to initialize the RAM 4. In addition, the contents of that initialization program could be adapted to the specifications of a particular microcomputer.

Furthermore, the initialization processing contents which can be set by the user could be set by means of dip switches which are provided external to microcomputer 11.

Moreover it would be equally possible to configure the microcomputer such that at least a part of the initialization processing which is executed based on user settings consists of essential processing, which must be executed in all cases.

Furthermore, the microcomputer could be configured such that all of the initialization processing is based on user settings, or alternatively, could be configured such that all of the set values which are used in the initialization program are default values.

Furthermore in some cases, depending upon the reliability of operation that is required, it may only be necessary to set the upper limit value of the period of the watchdog timer 7. Moreover it could be arranged that the operation of setting the clock signal source of the watchdog timer 7 consists of selecting a source of that clock signal, rather than selecting a frequency division ratio of a particular clock signal source as with the above embodiment.

Furthermore it would be possible to use only a single low power consumption mode of operation, i.e., the sleep mode alone, or the stop mode alone.

Moreover the invention is equally applicable to a microcomputer which does not utilize a low power consumption mode.

The user ROM could be implemented as a mask ROM or as a flash ROM. The invention is not limited in application to a body ECU of a vehicle, but could also be applied for example to an engine ECU, etc. Moreover the invention is not limited to a vehicle ECU, but is applicable in general to a microcomputer which is built into an apparatus that is controlled thereby.

What is claimed is:

1. A microcomputer which operates under a condition of being built into an apparatus which is controlled thereby, the microcomputer having a CPU (Central Processing Unit), and a user ROM (Read-Only Memory) having stored therein a user program which is executed by said CPU and has been prepared by a user, wherein said microcomputer comprises a boot ROM having stored therein an initialization program which is accessed and executed by said CPU prior to executing said user program, immediately after said CPU has been released from a reset condition, said initialization program being executed by said CPU to perform initialization processing which is necessary for enabling said CPU to execute said user program; wherein data utilized by said CPU in executing said initialization program include set values which can be specified beforehand by a user;

a memory region constituting a user setting region, into which said set values can be written by a user, is reserved within said user ROM;

during execution of said initialization program stored in said boot ROM, said set values are read out from said user setting region, and by said CPU in executing said initialization processing; and said initialization program is configured to enable at least a part of said initialization processing executed by said CPU when executing said initialization program to be modified in accordance with selective omission of writing data into said user setting region.

2. A microcomputer according to claim 1, wherein said initialization program is configured for judging data contents of said user program when said data contents of said user setting region are read out from said user ROM during execution of said initialization program, and for modifying said initialization processing in accordance with whether or not respective ones of said set values have been written into said user setting region.

3. A microcomputer according to claim 2, wherein said initialization program is configured for judging whether each of said set values has been written into said user setting region, and when it is judged that one of said set values has been omitted from being written into said user setting region, substituting a predetermined default value in place of said one of said set values, during execution of said initialization processing.

4. A microcomputer according to claim 1, wherein said initialization processing comprises processing whereby said CPU is inhibited from responding to interrupts.

5. A microcomputer according to claim 1, wherein said initialization processing comprises initializing of internal registers of said CPU.

6. A microcomputer according to claim 1, wherein said microcomputer further comprises a watchdog timer for monitoring the operating status of said CPU, and wherein said initialization processing comprises processing for setting the duration of at least one limit period of said watchdog timer.

7. A microcomputer according to claim 1, wherein said microcomputer further comprises a watchdog timer for monitoring the operating status of said CPU, and wherein said initialization processing comprises processing for setting a clock signal source for operating said watchdog timer.

8. A microcomputer according to claim 7, wherein said processing for setting a clock signal source comprises setting a frequency division ratio of a circuit which performs frequency division of an input signal to produce a clock signal for operating said watchdog timer.

9. A microcomputer according to claim 7, wherein said processing for setting a clock signal source comprises selection of a source of a clock signal for operating said watchdog timer.

10. A microcomputer according to claim 1, including a clock signal generating circuit for generating an operating clock signal of said CPU, wherein said initialization processing comprises processing for setting an oscillation stabilization interval for said clock signal generating circuit.

11. A vehicle ECU (Electronic Control Unit) which is equipped with a microcomputer as claimed in claim 1.

12. A microcomputer which operates under a condition of being built into an apparatus which is controlled thereby, the microcomputer having a CPU (Central Processing Unit), and a user ROM (Read-Only Memory) having stored therein a user program which is executed by said CPU and has been prepared by a user, wherein said microcomputer comprises
a boot ROM having stored therein an initialization program which is accessed and executed by said CPU prior to executing said user program, immediately after said CPU has been released from a reset condition, said initialization program being executed by said CPU to perform initialization processing which is necessary for enabling said CPU to execute said user program; wherein
said microcomputer includes a clock signal generating circuit for supplying to said CPU an operating clock signal, said clock signal generating circuit having a vibrator element for use in generating said operating clock signal, wherein said initialization processing is executed during an interval in which said vibrator element is in unstable operating condition.

13. A microcomputer according to claim 12, wherein said initialization processing is executed immediately following release of said microcomputer from a reset condition.

14. A microcomputer according to claim 12, wherein said initialization processing comprises processing whereby said CPU is inhibited from responding to interrupts.

15. A microcomputer according to claim 12, wherein said initialization processing comprises initializing of internal registers of said CPU.

16. A microcomputer according to claim 12, wherein said microcomputer further comprises a watchdog timer for monitoring the operating status of said CPU, and wherein said initialization processing comprises processing for setting the duration of at least one limit period of said watchdog timer.

17. A microcomputer according to claim 12, wherein said microcomputer further comprises a watchdog timer for monitoring the operating status of said CPU, and wherein said initialization processing comprises processing for setting a clock signal source for operating said watchdog timer.

18. A microcomputer according to claim 17, wherein said processing for setting a clock signal source comprises setting a frequency division ratio of a circuit which performs frequency division of an input signal to produce a clock signal for operating said watchdog timer.

19. A microcomputer according to claim 17, wherein said processing for setting a clock signal source comprises selection of a source of a clock signal for operating said watchdog timer.

20. A microcomputer according to claim 12, including a clock signal generating circuit for generating an operating clock signal of said CPU, wherein said initialization processing comprises processing for setting an oscillation stabilization interval for said clock signal generating circuit.

21. A vehicle ECU (Electronic Control Unit) which is equipped with a microcomputer as claimed in claim 12.

22. A microcomputer which operates under a condition of being built into an apparatus which is controlled thereby, the microcomputer having a CPU (Central Processing Unit), and a user ROM (Read-Only Memory) having stored therein a user program which is executed by said CPU and has been prepared by a user, wherein said microcomputer comprises
a boot ROM having stored therein an initialization program which is accessed and executed by said CPU prior to executing said user program, immediately after said CPU has been released from a reset condition, said initialization program being executed by said CPU to perform initialization processing which is necessary for enabling said CPU to execute said user program; wherein
said CPU is configured for functioning in a low power consumption mode in which operation of said CPU is temporarily halted with the contents of internal registers of said CPU having been saved, wherein when operation in said low power consumption mode is terminated, said CPU accesses said boot ROM and executes a part of said initialization processing that constitutes operations which are necessary for restarting a normal mode of operation of said CPU.

23. A microcomputer according to claim 22, said microcomputer including a clock signal generating circuit for supplying to said CPU an operating clock signal, said clock signal generating circuit having a vibrator element for use in generating said operating clock signal, wherein said part of the initialization processing which is executed when operation of said CPU in said low power consumption mode is terminated is further executed during an interval in which said vibrator element operates in an unstable condition.

24. A microcomputer according to claim 23, wherein said part of the initialization processing is executed immediately following termination of operation of said CPU in said low power consumption mode.

25. A microcomputer according to claim 23, wherein operation in said low power consumption mode is periodically executed, with a predetermined fixed repetition period.

26. A microcomputer according to claim 22, wherein said initialization processing comprises processing whereby said CPU is inhibited from responding to interrupts.

27. A microcomputer according to claim 22, wherein said initialization processing comprises initializing of internal registers of said CPU.

28. A microcomputer according to claim 22, wherein said microcomputer further comprises a watchdog timer for monitoring the operating status of said CPU, and wherein said initialization processing comprises processing for setting the duration of at least one limit period of said watchdog timer.

29. A microcomputer according to claim 22, wherein said microcomputer further comprises a watchdog timer for monitoring the operating status of said CPU, and wherein said initialization processing comprises processing for setting a clock signal source for operating said watchdog timer.

30. A microcomputer according to claim 29, wherein said processing for setting a clock signal source comprises setting a frequency division ratio of a circuit which performs frequency division of an input signal to produce a clock signal for operating said watchdog timer.

31. A microcomputer according to claim 29, wherein said processing for setting a clock signal source comprises selection of a source of a clock signal for operating said watchdog timer.

32. A microcomputer according to claim 22, including a clock signal generating circuit for generating an operating clock signal of said CPU, wherein said initialization processing comprises processing for setting an oscillation stabilization interval for said clock signal generating circuit.

33. A vehicle ECU (Electronic Control Unit) which is equipped with a microcomputer as claimed in claim 22.

* * * * *